United States Patent
Seguchi et al.

(10) Patent No.: US 10,377,910 B2
(45) Date of Patent: Aug. 13, 2019

(54) AQUEOUS INK COMPOSITION AND INK JET RECORDING METHOD

(71) Applicant: Seiko Epson Corporation, Tokyo (JP)

(72) Inventors: Kenichi Seguchi, Okaya (JP); Takayoshi Kagata, Shiojiri (JP); Tsuyoshi Sano, Shiojiri (JP); Akira Mizutani, Matsumoto (JP); Tadashi Watanabe, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/446,340

(22) Filed: Mar. 1, 2017

(65) Prior Publication Data

US 2017/0283639 A1 Oct. 5, 2017

(30) Foreign Application Priority Data

Apr. 5, 2016 (JP) .................. 2016-076005

(51) Int. Cl.
   *B41J 2/01* (2006.01)
   *C09D 11/38* (2014.01)
   *C09D 11/36* (2014.01)
   *C09D 11/107* (2014.01)

(52) U.S. Cl.
   CPC .............. *C09D 11/38* (2013.01); *B41J 2/01* (2013.01); *C09D 11/107* (2013.01); *C09D 11/36* (2013.01)

(58) Field of Classification Search
   None
   See application file for complete search history.

(56) References Cited

U.S. PATENT DOCUMENTS

| 9,353,276 | B2 | 5/2016 | Yatake et al. | |
|---|---|---|---|---|
| 2004/0218026 | A1* | 11/2004 | Matsushita | B41J 2/175 347/93 |
| 2007/0037901 | A1* | 2/2007 | Kanaya | C09B 67/0013 523/160 |
| 2007/0206048 | A1* | 9/2007 | Kusunoki | B41J 2/16508 347/31 |
| 2009/0258196 | A1* | 10/2009 | Nagashima | B41M 5/0023 428/195.1 |

FOREIGN PATENT DOCUMENTS

| JP | 2014-172987 A | 9/2014 |
|---|---|---|
| JP | 2015-160931 A | 9/2015 |

* cited by examiner

*Primary Examiner* — Erica S Lin
(74) *Attorney, Agent, or Firm* — Harness, Dickey & Pierce, P.L.C.

(57) ABSTRACT

An aqueous ink composition contains an organic solvent, a surfactant, and resin fine particles. The resin of the resin fine particles takes 500 minutes or more to melt at 40° C. with the surfactant, which is a temperature relatively close to the temperature the ink jet head is heated to by the platen or the like during recording. Such an aqueous ink composition exhibits a good filling property and can be continuously ejected stably.

18 Claims, 1 Drawing Sheet

AQUEOUS INK COMPOSITION AND INK JET RECORDING METHOD

BACKGROUND

1. Technical Field

The present invention relates to an aqueous ink composition and an ink jet recording method.

2. Related Art

An ink jet recording method allows a relatively simple apparatus to print high-definition images and is being rapidly developed in various fields. Ejection stability and other properties of this method are studied from various viewpoints. For example, JP-A-2014-172987 discloses an ink jet ink composition suitable for use for recording on a poorly absorbent coated paper, containing a self-dispersible pigment, resin particles, and wax particles, from the viewpoint of providing an ink jet ink composition that can be stably ejected by an ink jet method and that can produce recorded articles having a high optical density (image density) and good fastness to rubbing when ejected on poorly absorbent coated paper. In this ink jet ink composition, the resin of the resin particles has a glass transition temperature in the range of −150° C. to 10° C., and the wax particles have an average particle size in the range of 100 nm to 250 nm.

In general, resins that can impart a fastness to rubbing (hereinafter referred to as rub fastness) to recorded articles adhere readily and harden. However, once the resin in the ink composition in an ink jet head melts and then adheres to the wall or the like in the head, the ink cannot be normally ejected, and stable continuous ejection of the ink is hindered. The longer the idling time (period during which ink is not ejected), the worse the stability of continuous ejection.

The present inventors have found that the surfactant in the ink composition causes the resin to melt in the ink jet head. The surfactant is, however, an essential constituent of the ink composition for allowing the ink composition to wet and spread over the recording medium and thus to exhibit a good filling property.

SUMMARY

An advantage of some aspects of the invention is that it provides an aqueous ink composition that can exhibit a good filling property and can be continuously ejected stably, and an ink jet recording method.

The present inventors have conducted intensive research to solve the above issue and found that a combination of a resin that takes a specific time or more to melt and a surfactant enables the ink composition to be continuously ejected stably without degrading the filling property, and reduces clogging caused by the resin fused in the head, when the melting of resins with a surfactant was examined at 40° C., which is a temperature relatively close to the temperature the ink jet head is heated to by the platen or the like during recording.

The aqueous ink composition according to an aspect of the invention contains an organic solvent, a surfactant, and resin fine particles made of a resin. The resin takes 500 minutes or more to melt at 40° C. with the surfactant. Such an aqueous ink composition exhibits a good filling property and can be continuously ejected stably.

Preferably, the resin of the resin fine particles takes 5 minutes or less to melt at 80° C. with the surfactant. Such an aqueous ink composition tends to exhibit an improved filling property.

Preferably, the value defined by the expression A/B is 300 or more. In the expression, A represents the time taken for the resin of the resin fine particles to melt at 40° C. with the surfactant, and B represents the time taken for the resin of the resin fine particles to melt at 80° C. with the surfactant. When this condition is established, the aqueous ink composition can be continuously ejected more stably.

The organic solvent is an organic solvent having a standard boiling point of 280° C. or less, and the content of organic solvent having a standard boiling point of more than 280° C. is 3% by mass or less relative to the total mass of the aqueous ink composition. Such an aqueous ink composition is suitable for recording on poorly absorbent media, but is less moisture-retentive and easy to dry, likely to be concentrated by drying. The resin concentrated by drying is likely to melt and cause clogging. The technique of the invention is advantageous in this case.

The content of the organic solvent having a standard boiling point of 280° C. or less may be 5% by mass to 30% by mass relative to the total mass of the aqueous ink composition. The pigment and resin constituents tend to be stably dispersed in such an aqueous ink composition, and the ink composition can be continuously ejected more stably, to exhibit an improved resistance to drying and an improved filling property (degree of wetting and spreading) for the recording medium, and to be able to penetrate the recording medium satisfactorily.

Preferably, the content of the resin fine particles is 0.5% by mass to 15% by mass relative to the total mass of the aqueous ink composition. Thus, the fastness to rubbing of recorded articles and ejection stability tend to be further improved.

Preferably, the content of the surfactant is 0.3% by mass to 3% by mass relative to the total mass of the aqueous ink composition. When the surfactant content is 3% by mass or less, the aqueous ink composition tends to improve the rub fastness of the resulting recorded article and to be able to be continuously ejected more stably. Also, when the surfactant content is 0.3% by mass or more, the aqueous ink composition tends to exhibit an improved filling property in the resulting recorded article and to be able to be continuously ejected more stably.

The surfactant may have a hydrophile-lipophile balance (HLB) of 7 to 14. The use of such a surfactant tends to facilitate the control of the time taken to melt in an appropriate range and tends to improve the filling property of the ink composition. Also, surfactants having an HLB in that range are readily available.

Preferably, the surfactant may be at least either an acetylene glycol-based surfactant or a silicone surfactant. These surfactants tend to facilitate the control of the time taken to melt in an appropriate range and tend to improve the filling property of the ink composition. In addition, these surfactants are readily available.

Preferably, the resin fine particles are made of a composite resin. The times taken for such a resin to melt at 40° C. and 80° C. with the surfactant tend to be easy to control in appropriate ranges.

Preferably, the resin of the resin fine particles contains a (meth)acrylic resin. Such a resin tends to improve the stability of continuous ejection.

The present invention is also directed to an ink jet recording method including applying the above-described aqueous ink composition onto a recording medium through a nozzle of an ink jet head.

Preferably, when the aqueous ink composition is applied, the surface temperature of the recording medium is 70° C. or less. Thus, the ink jet head is prevented from being heated, so that nozzle faults during printing can be reduced. Consequently, the stability of continuous ejection tends to be improved.

Preferably, the ink jet head includes a pressure chamber having an outlet through which the aqueous ink composition is transferred to the nozzle, and an element capable of applying a pressure to the aqueous ink composition in the pressure chamber to eject the aqueous ink composition through the nozzle. The element is disposed at a position in the pressure chamber other than the position opposing the outlet. This is advantageous for designing the ink jet head and can solve problems with the adhered and hardened resin.

The applying of the aqueous ink composition may be performed for 1 hour or more without applying an external pressure to the ink jet head to discharge the aqueous ink composition from the nozzle. This ink jet method is suitable in this case, where the resin is rather likely to adhere and harden.

The recording medium may be poorly absorbent or non-absorbent. The ink jet recording method is suitable for recording on poorly absorbent media.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in detail with reference to the drawings as needed. However, the invention is not limited to the disclosed embodiments, and various modifications may be made without departing from the scope and spirit of the invention. The same elements in the drawings are designated by the same reference numerals, and thus description thereof is omitted. The relative positions and other positional relationships are in accordance with the drawings unless otherwise specified. The dimensional proportions in the drawings are not limited to those shown in the drawings. In the description, (meth)acrylate refers to an acrylate and the corresponding methacrylate.

Aqueous Ink Composition

The aqueous ink composition according to an embodiment of the invention contains an organic solvent, a surfactant, and resin fine particles made of a resin. The resin takes 500 minutes or more to melt at 40° C. with the surfactant. The time taken for the resin of the resin fine particles to melt at 40° C. with the surfactant, mentioned herein refers to the time taken for the resin to start melting. The aqueous ink composition is an ink composition containing water as a solvent and as a main constituent.

If a nozzle fails to eject the ink composition due to air bubbles produced in the ink jet head, the ink composition is retained in the pressure chamber and dried by heat from the platen or the like. Consequently, the resin of the resin fine particles in the ink composition melts in the head and then adheres thereto, thus causing clogging. While the adhered resin on the nozzle plate can be removed by wiping, the clogging caused by the adhered resin in the ink jet head cannot be eliminated by wiping. The clogging caused by the adhered resin in the ink jet head can be eliminated to some extent by suction cleaning, but cannot by flushing. In order to eliminate the clogging caused by the adhered resin in the ink jet head without suspending printing, however, flushing is necessary. The continuous ejection of ink through nozzles without suspension can prevent the resin from melting and adhering in the ink jet head. However, once bubbles hinder the ink composition from being ejected through a nozzle, the ink composition is dried, and the resin melts and adheres to the ink jet head. In particular, since the head moves over (scans) the heated platen, nozzles are likely to receive heat from the platen, and the ink composition is dried by this heat.

On the other hand, the aqueous ink composition of the present embodiment contains a surfactant that can ensure filling of the ink composition, and resin fine particles that take a specific time to melt. The resin is kept from melting in the ink jet head, thus being prevented from adhering and hardening in the ink jet head. The aqueous ink composition of the present embodiment exhibits both a good filling property and good stability of continuous ejection. Although the surfactant acts to melt the resin, it is expected that when the melted resin has adhered to the inner wall of the cavity and hardened, the surfactant will make the adhered resin easy to remove. The constituents of the aqueous ink composition of the present embodiment will now be described.

Organic Solvent

The organic solvent may be, but is not limited to, a resin-dissolving solvent, a penetrating solvent, and a moisture-retaining solvent. These organic solvents may be used singly or in combination.

Examples of the resin-dissolving solvent include, but are not limited to, dimethyl sulfoxide (DMSO), dimethylformamide (DMF), hexamethylphosphoramide (HMPA), pyrrolidone-based solvents, dioxane, and other aprotic polar solvents. Pyrrolidone-based solvents are advantageous. Examples thereof include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone, and 2-pyrrolidone is more advantageous. These resin-dissolving solvents tend to prevent the pigment from adhering to the head or cavities and to increase adhesion to vinyl chloride or any other non-absorbent recording media and rub fastness on these media.

The content of the resin-dissolving solvent is preferably 1.0% to 30% by mass, more preferably 5% to 25% by mass, and still more preferably 12% to 25% by mass, relative to the total mass of the aqueous ink composition. When the content of the resin-dissolving solvent is in such a range, the pigment and resin constituents can be stably dispersed in the ink, and the aqueous ink composition can be continuously ejected more stably.

Examples of the penetrating solvent include, but are not limited to, alkanediols preferably having a carbon number of 4 or more, such as butanediol, pentanediol, hexanediol, and octanediol; and glycol ethers, such as alkylene glycol monoethers and alkylene glycol diethers. The use of such a penetrating solvent tends to enable the ink composition to exhibit an improved filling property (degree of wetting and spreading) for the recording medium and to penetrate the recording medium satisfactorily.

The content of the penetrating solvent is preferably 1% to 20% by mass, more preferably 5% to 15% by mass, and still more preferably 6% to 12% by mass, relative to the total mass of the aqueous ink composition. When the content of the penetrating solvent is in such a range, the ink composition tends to exhibit an improved filling property (degree of wetting and spreading) for the recording medium and to be able to penetrate the recording medium satisfactorily.

Examples of the moisture-retaining solvent include, but are not limited to, polyol compounds (having three or more hydroxyl groups), such as glycerin; and alkanediols preferably having a carbon number of 3 or less or alkandiols having a polyether skeleton made up of alkylene glycols having a carbon number of 3 or less, such as ethylene glycol, diethylene glycol, triethylene glycol, polyethylene glycol, propylene glycol, dipropylene glycol, tripropylene glycol, polypropylene glycol, and propanediol. These moisture-retaining solvents tend to prevent the ink composition from drying in the ink jet head, consequently enhancing the stability of continuous ejection.

The content of the moisture-retaining solvent is preferably 0% to 12% by mass, more preferably 2.5% to 10% by mass, and still more preferably 5% to 7.5% by mass, relative to the total mass of the aqueous ink composition. When the content of the moisture-retaining solvent is in such a range, the ink composition tends to be prevented from drying in the ink jet head and to be able to be continuously ejected more stably.

The organic solvent may be an organic solvent having a standard boiling point of 280° C. or less. The content of the organic solvent having a standard boiling point of 280° C. or less is preferably 5% to 30% by mass, more preferably 10% to 30% by mass, and still more preferably 15% to 30% by mass, relative to the total mass of the aqueous ink composition. When the content of the organic solvent having a standard boiling point of 280° C. or less is in such a range, the pigment and resin constituents tend to be stably dispersed in the aqueous ink composition, and the ink composition can be continuously ejected more stably, to exhibit an improved resistance to drying and an improved filling property (degree of wetting and spreading) for the recording medium, and to be able to penetrate the recording medium more satisfactorily.

If a solvent having a standard boiling point of more than 280° C. is contained, the content thereof is preferably 7% by mass or less, more preferably 3% by mass or less, still more preferably 2% by mass or less, further preferably 1% by mass or less, still further preferably 0.5% by mass or less, and much further preferably 0.1% by mass or less, relative to the total mass of the aqueous ink composition. The lower limit of the content of the organic solvent having a standard boiling point of more than 280° C. is 0% by mass. When the content of the organic solvent having a standard boiling point of more than 280° C. is in such a range, the aqueous ink composition is suitable for recording on poorly absorbent media, but is less moisture-retentive and easy to dry. The ink built up in the ink jet head is likely to become concentrated by drying, and consequently, the resin is likely to melt and cause clogging. The technique of the invention is advantageous in this case.

The content of the organic solvent is preferably 15% to 40% by mass, more preferably 20% to 35% by mass, and still more preferably 25% to 30% by mass, relative to the total mass of the aqueous ink composition. When the content of the organic solvent is in such a range, the pigment and resin constituents tend to be stably dispersed in the aqueous ink composition, and the ink composition can be continuously ejected more stably, to exhibit an improved resistance to drying and an improved filling property (degree of wetting and spreading) for the recording medium, to improve the rub fastness of the resulting recorded article, and to be able to penetrate the recording medium more satisfactorily.

Water

The ink composition of the present embodiment is aqueous. The water content in the ink composition is preferably 40% to 95% by mass, more preferably 45% to 90% by mass, still more preferably 50% to 80% by mass, further preferably 55% to 75% by mass, and still further preferably 60% to 70% by mass, relative to the total mass of the aqueous ink composition.

Plastic films and other poorly absorbent or non-absorbent recording media do not absorb aqueous inks and repel them. Thus, aqueous inks do not intrinsically have a sufficient filling property for non-absorbent recording media and are therefore unsuitable to form high-quality images on non-absorbent recording media, compared with organic solvent-based inks. However, the aqueous ink composition of the present embodiment can form images satisfactorily even on a poorly absorbent or non-absorbent recording medium while exhibiting a good filling property. Thus, the aqueous ink composition of the present embodiment is suitable for recording on poorly absorbent or non-absorbent media.

Surfactant

The surfactant may be, but is not limited to, an acetylene glycol-based surfactant, a fluorosurfactant, or a silicone surfactant. Preferably, the surfactant may be at least either an acetylene glycol-based surfactant or a silicone surfactant. These surfactants tend to facilitate the control of the time taken for the resin to melt in an appropriate range and to improve the filling property of the ink composition and are readily available.

The acetylene glycol-based surfactant may be, but is not limited to, at least one selected from the group consisting of 2,4,7,9-tetramethyl-5-decyne-4,7-diol and alkylene oxide adducts thereof and 2,4-dimethyl-5-decyne-4-ol and alkylene oxide adducts thereof. The acetylene glycol-based surfactant is commercially available, and examples of the commercially available acetylene glycol-based surfactant include, but are not limited to, Olfine 104 series and Olfine E series, such as Olfine E1010, (each a product of Air Products and Chemicals Inc.); and Surfynol 465 and Surfynol 61 (each a product of Nissin Chemical Industry). Acetylene glycol-based surfactants may be used singly or in combination.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. The fluorosurfactant is commercially available, and examples of the commercially available fluorosurfactant include, but are not limited to, S-144 and S-145 (each produced by Asahi Glass); FC-170C, FC-430, and Fluorad-FC4430 (each produced by Sumitomo 3M); FSO, FSO-100, FSN, FSN-100, and FS-300 (each produced by Dupont); and FT-250 and FT-251 (each produced by Neos). Fluorosurfactants may be used singly or in combination.

The silicone surfactant may be a polysiloxane compound or a polyether-modified organosiloxane. The silicone surfactant is commercially available, and examples of the commercially available silicone surfactant include, but are not limited to, BYK-306, BYK-307, BYK-333, BYK-341, BYK-345, BYK-346, BYK-347, BYK-348, and BYK-349 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

The surfactant preferably has an HLB of 6 to 15, more preferably 7 to 14, still more preferably 11 to 14, further preferably 11 to 13. A surfactant having such an HLB tends to facilitate the control of the time taken for the resin to melt in an appropriate range and tends to improve the filling property of the ink composition. Also, such a surfactant is readily available. The term "HLB" used herein is the abbreviation for hydrophile-lipophile balance and is determined by the Griffin method.

The surface tension of the surfactant is preferably 15 mN/m to 45 mN/m, more preferably 17.5 mN/m to 40 mN/m, and still more preferably 20 mN/m to 35 mN/m. When the surfactant has such a surface tension, the filling property of the ink composition tends to be improved. The surface tension can be measured by the method that will be described in Examples.

The surfactant content is preferably 0.3% by mass to 3% by mass relative to the total mass of the aqueous ink composition. More preferably, the lower limit of the surfactant content is 0.5% by mass, still more preferably 1.2% by mass, relative to the total mass of the aqueous ink composition. Also, the upper limit of the surfactant content is preferably 2% by mass, more preferably 1.75% by mass, and still more preferably 1.6% by mass, relative to the total mass of the aqueous ink composition. When the surfactant content is 3% by mass or less, the aqueous ink composition can be continuously ejected more stably and rub fastness can be enhanced. Also, when the surfactant content is 0.3% by mass or more, the aqueous ink composition tends to exhibit an improved filling property in the resulting recorded article and to be able to be continuously ejected more stably. If the stability of continuous ejection is improved, the resin is kept from adhering to the head, and the adhered and hardened resin, if produced, is easy to remove and can be efficiently removed by head cleaning or the like. This is probably because when the resin adheres and hardens, the surfactant present around the resin and pigment acts on the resin and makes the lumps of the adhered resin easy to break.

Resin Fine Particles

The resin fine particles will form a resin coating film on a recording medium to cause the aqueous ink composition to adhere to the recording medium, thus enhancing the rub fastness of the resulting image. The resin coating film protects the pigment and enhances the adhesion thereof and the rub fastness of the resulting image on the recording medium. The resin fine particles may be referred to as "binder solids" or "resin emulsion".

Examples of the resin of the resin fine particles include, but are not limited to, homopolymers or copolymers of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluororesins, and natural resins. Preferably, the resin of the resin fine particles is at least either a (meth)acrylic resin or a styrene-(meth)acrylic acid copolymer, more preferably either an acrylic resin or a styrene-acrylic acid copolymer, and still more preferably a styrene-acrylic acid copolymer. If such a copolymer is used, the copolymer may be a random copolymer, a block copolymer, an alternating copolymer, or a graft copolymer.

The resin fine particles may be prepared by a known method using known materials, or commercially available resin fine particles may be used. Commercially available resin fine particles include, but are not limited to, Micro Gel E-1002 and Micro Gel E-5002 (each produced by Nippon Paint Co., Ltd.); VONCOAT 4001 and VONCOAT 5454 (each produced by DIC); SAE 1014 (produced by Zeon Corporation), Saivinol SK-200 (produced by Saiden Chemical Industry Co., Ltd.); and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (each produced by BASF).

If the resin fine particles are prepared by a known method, any of the following methods may be applied. Some of the methods may be combined if necessary, and the preparation method is not limited to the following. For the preparation, a polymerization catalyst (polymerization initiator) and a dispersant may be mixed into a monomer that will form a desired resin for polymerization (emulsion polymerization), or a solution of a resin having a hydrophilic portion in a water-soluble organic solvent may be mixed with water, followed by removing the water-soluble organic solvent by distillation or the like. A solution of a resin in a water-insoluble organic solvent and a dispersant may be mixed in water.

Preferably, the resin fine particles are made of a composite resin. The composite resin is made up of two or more different resins having different monomer configurations (different in either type or content). The two or more resins may form any portions of the resin fine particles. The two or more resins may be discontinuously distinguished by the boundary therebetween or may form a continuous structure in which the monomer configuration changes continuously.

The two or more resins may form core-shell resin fine particles in which one of the two or more resins forms the core defining mainly the center of each particle and another forms the shell defining mainly the periphery of the particle. This structure is advantageous for imparting different properties to the periphery and the center of the particle. In this instance, the shell resin forms at least a portion of the periphery of the resin fine particle. Although a core-shell resin will now be described as an example of the composite resin, any composite resin can produce the same effect as the core-shell resin.

Core-shell resins allow the core and the shell to be independently controlled in terms of degree of crosslinking and glass transition temperature and are accordingly advantageous for controlling the solubility of the resin of the resin fine particles. If a core-shell resin is used as the resin of the resin fine particles, the times taken for the resin of the resin fine particles to melt at 40° C. and 80° C. with the surfactant can be easily controlled in appropriate ranges.

For a resin other than the core-shell resin, the time taken to melt can be controlled by varying the glass transition temperature or the degree of crosslinking. The time taken to melt can be controlled by changing the type or the amount of monomers used in resin synthesis as well as varying the glass transition temperature or the degree of crosslinking.

The resin of the resin fine particles preferably contains a (meth)acrylic resin. (Meth)acrylic resins tend to improve the stability of continuous ejection. The (meth)acrylic resin may be, but is not limited to, a homopolymer of a (meth)acrylic monomer, such as a (meth)acrylic acid or a (meth)acrylic acid ester, or a copolymer of a (meth)acrylic monomer and a vinyl monomer or any other monomer capable of being copolymerized with the (meth)acrylic monomer.

The resin of the resin fine particles may be a linear or a branched polymer or a three-dimensionally crosslinked polymer and is preferably a three-dimensionally crosslinked polymer.

The lower limit of the content of the resin fine particles is preferably 0.1% by mass, more preferably 0.5% by mass, still more preferably 1% by mass, and further preferably 2% by mass, relative to the total mass of the aqueous ink composition. The upper limit of the content of the resin fine particles is preferably 15% by mass, more preferably 10% by mass, still more preferably 7% by mass, and further preferably 5% by mass, relative to the total mass of the aqueous ink composition. When the content of the resin fine particles is in such a range, the rub fastness of the resulting recorded article and ejection stability of the ink composition tend to be further improved.

The resin of the resin fine particles takes 500 minutes or more, preferably 600 minutes or more, more preferably 700 minutes or more, to melt at 40° C. with the surfactant. The upper limit of the time taken for the resin of the resin fine particles to melt at 40° C. with the surfactant is not particularly limited, but is preferably 2000 minutes, more preferably 1750 minutes, still more preferably 1500 minutes. When the resin of the resin fine particles takes 500 minutes or more to melt at 40° C. with the surfactant, the stability of continuous ejection tends to be improved. Also, when the resin of the resin fine particles takes 2000 minutes or less to melt at 40° C. with the surfactant, the rub fastness of the resulting recorded article tends to be improved.

The time taken for the resin of the resin fine particles to melt at 40° C. with the surfactant can be controlled by varying the glass transition temperature or the degree of crosslinking of the resin or changing the type or the amount of monomers used in resin synthesis.

The resin of the resin fine particles takes preferably 5 minutes or less, more preferably 3 minutes or less, still more preferably 2 minutes or less, further preferably 1 minute or less, to melt at 80° C. with the surfactant. Also, the time taken for the resin of the resin fine particles to melt at 80° C. with the surfactant is preferably 0.3 minute or more, and more preferably 0.6 minutes or more. When the resin of the resin fine particles takes 5 minutes or less to melt at 80° C. with the surfactant, the filling property of the aqueous ink composition tends to be improved. Also, when the resin of the resin fine particles takes 0.3 minute or more to melt at 80° C. with the surfactant, the stability of continuous ejection of the ink composition and the rub fastness of printed articles tend to be improved. "The time taken for the resin of the resin fine particles to melt at 80° C. with the surfactant" mentioned herein refers to the time taken for the resin to melt completely.

When the resin of the resin fine particles takes a short time to melt (melts easily) at 80° C. with the surfactant and takes a long time to melt (difficult to melt) at 40° C. with the surfactant, the aqueous ink composition deposited on the recording medium is likely to form a film, so that the rub fastness of the resulting recorded article tends to be improved. For establishing these conditions, an appropriate amount of a surfactant having a high HLB may be used, or a low-HLB resin containing a hydrophobic constituent may be used.

The time taken for the resin of the resin fine particles to melt at 80° C. with the surfactant can be controlled by varying the glass transition temperature or the degree of crosslinking of the resin or changing the type or the amount of monomers used in resin synthesis.

The value defined by the expression A/B is preferably 300 or more, more preferably 500 or more, still more preferably 800 or more, and further preferably 1000 or more. Also, the value of the expression A/B is preferably 2000 or less. When the value of the expression A/B is 300 or more, the stability of continuous ejection tends to be improved. Also, when the value of the expression A/B is 2000 or less, rub fastness tends to be enhanced. In the expression, A represents the time taken for the resin of the resin fine particles to melt at 40° C. with the surfactant, and B represents the time taken for the resin of the resin fine particles to melt at 80° C. with the surfactant.

Time A taken for the resin of the resin fine particles to melt at 40° C. with the surfactant and time B taken for the resin to melt at 80° C. with the surfactant can be measured by dropping a dispersion liquid of the resin in an aqueous solution containing the surfactant on a film and observing the heated and dried droplet of the dispersion liquid under a microscope. This method will be further described in detail in Examples. The value of the expression A/B is calculated from the measured A and B.

Pigment

The pigment may be, but is not limited to, a known pigment.

Exemplary black pigments include, but are not limited to, No. 2300, No. 900, MCF 88, No. 33, No. 40, No. 45, No. 52, MA 7, MA 8, MA 100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by CABOT); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (each produced by Degussa).

Exemplary white pigments include, but are not limited to, C.I. Pigment Whites 6, 18, and 21 and other inorganic white pigments, such as, titanium oxide, zinc oxide, zinc sulfide, antimony oxide, magnesium oxide, and zirconium oxide. Also, organic white pigments, apart from these inorganic white pigments, may be used, such as white hollow resin particles and polymer particles.

Pigments that can be used in a yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Exemplary magenta pigments include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

Exemplary cyan pigments include, but are not limited to, C.I. Pigment Blues 1, 2, 3, 15, 15:1, 15:2, 15:3, 15:34, 15:4, 16, 18, 22, 25, 60, 65, and 66 and C.I. Vat Blues 4 and 60.

Pigments that can be used for color inks other than magenta, cyan and yellow include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

Exemplary pearl pigments include, but are not limited to, pigments exhibiting pearly gloss or interference gloss, such as titanium dioxide-coated mica, fish scale foil, and bismuth oxychloride.

Exemplary metal pigments include, but are not limited to, elemental metals, such as aluminum, silver, gold, platinum, nickel, chromium, tin, zinc, indium, titanium, and copper, and alloys thereof.

The pigment content is preferably 0.1% to 30% by mass, more preferably 0.2% to 20% by mass, and still more preferably 0.2% to 5% by mass, relative to the total mass of the aqueous ink composition.

Other Resins

The aqueous ink composition of the present embodiment may further contain other resins such as a dispersant resin and a water-soluble resin. By adding a dispersant rein or a water-soluble resin, the glossiness of the resulting image tends to be improved. Examples of the dispersant resin include, but are not limited to, polyvinyl alcohols, polyvinyl pyrrolidones, polyacrylic acid, acrylic acid-acrylonitrile copolymer, vinyl acetate-acrylic acid ester copolymer, acrylic acid-acrylic acid ester copolymer, styrene-acrylic acid copolymer, styrene-methacrylic acid copolymer, styrene-methacrylic acid-acrylic acid ester copolymer, styrene-α-methylstyrene-acrylic acid copolymer, styrene-α-methylstyrene-acrylic acid-acrylic acid ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer, vinyl acetate-acrylic acid copolymer, and salts thereof. Among these, styrene-acrylic acid copolymer is preferred. If a copolymer is used, the copolymer may be a random copolymer, a block copolymer, an alternating copolymer, or a graft copolymer.

Other Constituents

To maintain good storage stability and good ejection stability, and also to reduce clogging and prevent degradation, the aqueous ink composition may optionally contain other constituents, such as a solubilizing agent, a viscosity modifier, a pH adjuster, an antioxidant, a preservative, an antifungal agent, a corrosion inhibitor, a chelating agent for capturing metal ions affecting the dispersion of the pigment, and other additives.

Ink Jet Recording Method

The ink jet recording method according to an embodiment of the invention includes applying the above-described aqueous ink composition onto a recording medium through a nozzle of an ink jet head.

Applying Ink Composition

The upper limit of the surface temperature of the recording medium when the aqueous ink composition is applied thereto is preferably 70° C., more preferably 50° C., still more preferably 45° C., further preferably 40° C., and still further preferably 38° C. The lower limit of the surface temperature of the recording medium when the aqueous ink composition is applied thereto is preferably 20° C., more preferably 25° C., and still more preferably 30° C. When the aqueous ink composition is applied onto the recording medium having a surface temperature of 70° C. or less, the ink jet head is prevented from being heated, so that nozzle faults during printing can be reduced. Thus, the stability of continuous ejection tends to be improved. Also, when the surface temperature of the recording medium onto which the aqueous ink composition is applied is 20° C. or more, the aqueous ink composition tends to exhibit an improved filling property for recording media, particularly non-absorbent recording media such as vinyl chloride media, thus improving image quality.

Figure 1:
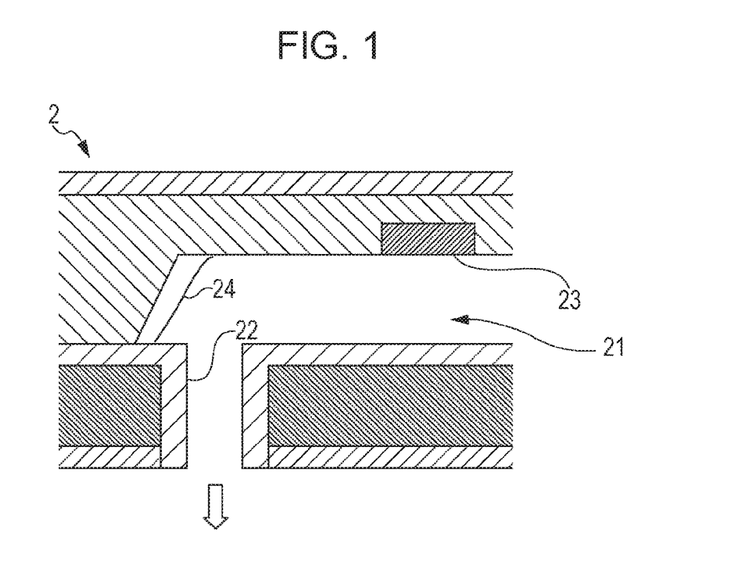
FIG. 1 is a schematic view of an ink jet head used in an embodiment of the invention.

Preferably, the ink jet head includes a pressure chamber 21 having an outlet through which the aqueous ink composition is transferred to the nozzle 22, and an element 23 that applies a pressure to the aqueous ink composition in the pressure chamber 21 to eject the ink through the nozzle 22. The element 23 is disposed at a position in the pressure chamber 21 other than the position opposing the outlet. FIG. 1 is a schematic view of an ink jet head used in an embodiment of the invention. To forcibly discharge the ink composition from the nozzle so as to remove adhered and hardened resin 24, it is advantageous that an element, such as a piezoelectric element, be disposed right above the nozzle. This is however undesirable in view of designing the head. The element is desirably disposed at a position other than the position right above the nozzle in terms of designing, and the idea of the invention is useful in such a case. The element may be an electromechanical conversion element, such as a piezoelectric element, capable of varying the capacity of the cavity by mechanical deformation, or an electro-thermal conversion element capable of generating heat to form bubbles in the ink.

In FIG. 1, the position in the pressure chamber 21 opposing the outlet communicating with the nozzle 22 lies on the imaginary lines extending upward from the wall of the outlet and in the area between the imaginary lines. For example, in the head shown in FIG. 1, the outlet has the same area as the nozzle 22 in a direction perpendicular to the direction in which ink is ejected. If the element 23 is disposed at a position other than the position opposing the outlet, this means that at least a portion of the element 23 does not lie in the region opposing the outlet. This is advantageous in terms of freedom of designing the element and the pressure chamber.

The applying of the aqueous ink composition, or recording, may be performed for 1 hour or more without applying an external pressure to the ink jet head to discharge the aqueous ink composition from the nozzle. In this instance, this application of an external pressure implies that a negative pressure is applied by suction or a positive pressure is applied from the upstream side of the head so that ink is discharged (flushed), but does not mean that the pressure is applied by a function of the head. The applying of the ink composition, or recording, is not necessarily continuous and may be intermittently performed, as long as an external pressure is not applied to discharge ink. In the case of intermittent recording, the time of recording is the cumulative time, and the applying of the aqueous ink composition is performed for a cumulative time of 1 hour or more. The time of recording without applying an external pressure may be 1 to 4 hours or, more preferably, 2 to 3 hours. The ink jet recording method of the present embodiment is suitable in the case, where the resin is rather likely to adhere and harden. For one recording operation, preferably, an external pressure is not applied to the ink jet head during recording to discharge the aqueous ink composition from the nozzle. Preferably, the application of the external pressure for discharging the aqueous ink composition from the nozzle is performed at least either before or after recording operation. Such a method enables high-speed recording and enhances ejection stability.

Drying

The ink jet recording method of the present embodiment may further include drying the recording medium onto which the aqueous ink composition has been applied. Thus, the resin in the aqueous ink composition on the recording medium will melt to form a recorded article with the ink composition exhibiting a good filling property. The surface temperature of the recording medium in the drying is preferably 50° C. to 150° C., more preferably 70° C. to 120° C., and still more preferably 80° C. to 100° C. When the drying temperature is in such a range, rub fastness tends to be enhanced.

Recording Medium

The recording medium used in the ink jet recording method of the present embodiment may be, but is not limited to, an absorbent recording medium, a non-absorbent recording medium, or a poorly absorbent medium. The ink jet recording method of the present embodiment is advantageous for recording on a poorly absorbent or non-absorbent medium. The aqueous ink composition is more likely to be repelled from non-absorbent or poorly absorbent recording media as the absorbency of the media is lower, thereby degrading the filling property. Therefore, the ink jet recording method of the present embodiment is advantageous for using such recording media.

More specifically, a poorly absorbent or a non-absorbent recording medium mentioned herein is such that the recording surface of the medium can absorb water at a rate of 10 mL/m$^2$ or less for a period of 30 ms from the beginning of contact with water when measured by Bristow's method. The Bristow's method is most broadly used as a method for measuring liquid absorption for a short time, and Japan Technical Association of the Pulp and Paper Industry (JAPAN TAPPI) has officially adopted this method. Details of this method are specified in Standard No. 51 of "paper and paperboard, liquid absorbency test method, Bristow's method" in "JAPAN TAPPI Test Methods, 2000 version".

Non-absorbent and poorly absorbent media may be classified by the wettability of water on the recording surface thereof. For example, recording media may be characterized by measuring the rate of decrease in contact angle of 0.5 μL of water dropped on the recording surface of each recording medium (comparing the contact angle 0.5 ms after landing with the contact angle 5 s after landing). More specifically, non-absorbent recording media refer to those exhibiting a contact angle decreasing rate of less than 1%, and poorly absorbent recording media refer to those exhibiting a contact angle decreasing rate in the range of 1% to less than 5%. Absorbent media refer to those exhibiting a contact angle decreasing rate of 5% or more. The contact angle can be measured with, for example, a portable contact angle meter PCA-1 (manufactured by Kyowa Interface Science).

The poorly absorbent recording medium may be, but is not limited to, coated paper including a coating layer at the surface thereof for receiving oil-based ink. The coated paper may be, but is not limited to, book-printing paper, such as art paper, coated paper, or matte paper.

The non-absorbent recording medium may be, but is not limited to, a plastic film not provided with an ink-absorbing layer, or a paper sheet or any other base material coated with a plastic film. The plastic mentioned here may be polyvinyl chloride, polyethylene terephthalate, polycarbonate, polystyrene, polyurethane, polyethylene, or polypropylene.

The recording medium may be an ink-non-absorbent or poorly ink-absorbent plate made of a metal, such as iron, silver, copper, or aluminum, or glass.

Recording Apparatus

Figure 2:
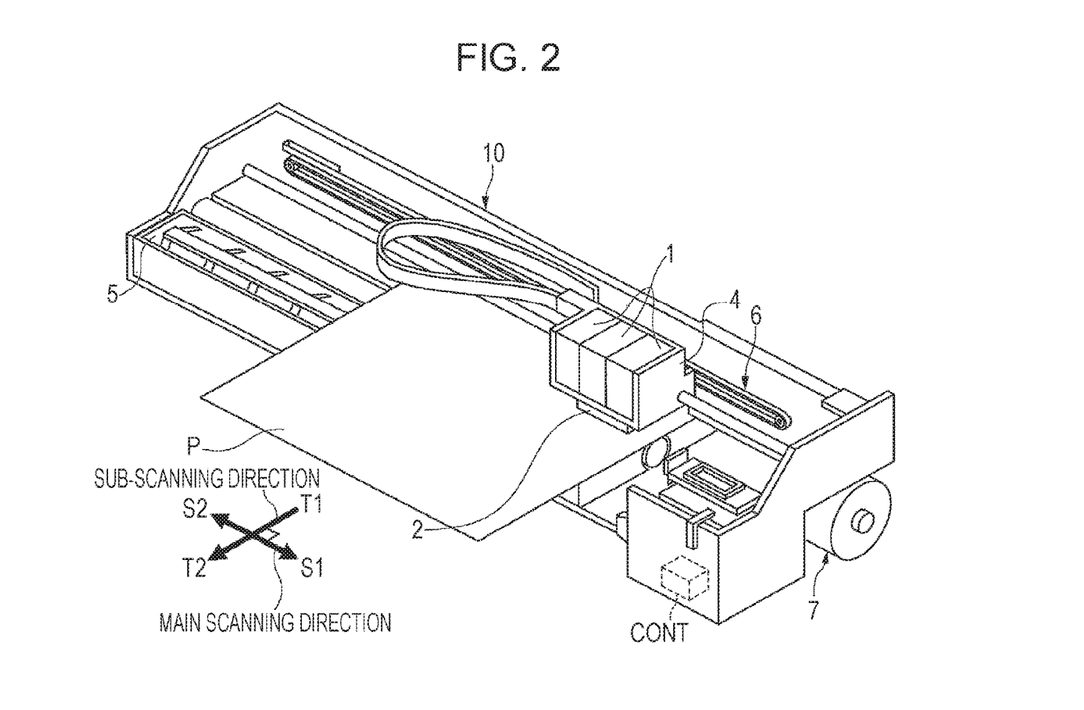
FIG. 2 is a schematic view of a recording apparatus used for the ink jet recording method according to an embodiment of the invention.

FIG. 2 is a perspective view of the structure of a recording apparatus 10 used in an embodiment of the invention. The recording apparatus 10 shown in FIG. 2 is a serial printer. A serial printer refers to a printing apparatus having a head that is mounted on a carriage movable in a predetermined direction and is configured to eject droplets on a recording medium while being moved with the movement of the carriage.

As shown in FIG. 2, the recording apparatus 10 includes an ink container 1, an ink jet head 2, and an ink feeding path (not shown) through which the aqueous ink composition is fed from the ink container 1 to the ink jet head 2, and may optionally include a carriage 4 on which the ink jet head 2 is mounted, a platen 5 disposed under the ink jet head 2 and on which the recording medium P is transported, a carriage moving mechanism 6 configured to move the carriage 4 relative to the recording medium P, and a medium transport mechanism 7 configured to transport the recording medium P in a direction, and a controller CONT configured to control the operations of the entire recording apparatus 1.

In an embodiment, the recording apparatus may be a line printer and is not limited to a serial printer. Also, the ink container 1 may be mounted on the carriage 4 or connected to the ink jet head 2 with an ink feeding path such as a tube without being mounted on the carriage 4.

Control of Recording Apparatus

In an embodiment, the recording method may be embodied as a method for controlling a recording apparatus. In this method, for example, when recording is performed in the above-described recording apparatus, the controller of the recording apparatus controls the recording apparatus to perform the above-described recording method.

EXAMPLES

The invention will be further described in detail with reference to Examples and Comparative Examples. However, the invention is not limited to the following Examples.

Ingredients of Aqueous Ink Compositions

The following ingredients were mainly used in the aqueous ink compositions of the Examples and Comparative Examples.

Coloring Material:
   C.I. Pigment Blue 15:3

Dispersant Resin:
   Styrene-acrylic acid based water-soluble resin (Tg: 55° C.)

Resin Fine Particles:
   Resin fine particles A to D were prepared in the preparation examples described below.

Solvents:
   2-Pyrrolidone
   1,3-Butanediol
   1,2-Hexanediol
   Glycerin Surfactant:
   Surfactants used are shown in Table 1. The term "HLB" is the acronym for hydrophile-lipophile balance and the values thereof used were determined by the Griffin method. Surface tension (mN/m) was measured by a Wilhelmy method using a surface tensiometer CBVP-Z (manufactured by Kyowa Interface Science) at a liquid temperature of 25° C. "Ease of melting" is a measure of how much the surfactant acts to melt the resin and is represented by the time taken for resin fine particles A to melt at 40° C., determined by the method described later using the predetermined time set at 45 minutes.

3: A plurality of resin fine particles were completely melted into a state where boundaries were not recognized.

2: Although the resin fine particles were partially fused with adjacent resin fine particles, the boundaries were recognized.

1: Resin fine particles were not fused therewith.

TABLE 1

| | HLB | Surface tension | Ease of melting | Type | Manufacturer |
|---|---|---|---|---|---|
| SAG002 | 12 | 24.5 | 3 | Silicone-based surfactant | Nissin Chemical Industry |
| SAG008 | 7 | 23.1 | 1 | Silicone-based surfactant | Nissin Chemical Industry |
| SAG014 | 9 | 23.2 | 1 | Silicone-based surfactant | Nissin Chemical Industry |
| E1010 | 14 | 31.0 | 1 | Acetylene-based surfactant | Nissin Chemical Industry |
| SAG503A | 11 | 24.1 | 1 | Silicone-based surfactant | Nissin Chemical Industry |

Preparation of Resin Fine Particles A

A reaction vessel equipped with a dropping device, a thermometer, a water-cooled reflux condenser, and a stirrer was charged with 100 parts of ion exchanged water, and 0.2 part of potassium persulfate was added as a polymerization initiator to the reaction vessel with stirring in a nitrogen atmosphere at 70° C. Into this vessel, a monomer solution containing 0.05 part of sodium lauryl sulfate, 22 parts of styrene, 50 parts of n-butyl acrylate, and 0.02 part of t-dodecyl mercaptan in 7 parts of ion exchanged water was dropped at 70° C. for reaction, and thus core particles were formed. Then, 2 parts of 10% solution of ammonium persulfate was added, followed by stirring, and further a reaction liquid containing 30 parts of ion exchanged water, 0.2 part of potassium lauryl sulfate, 17 parts of methyl acrylate, 20 parts of ethyl acrylate, 30 parts of methyl methacrylate, 5 parts of acrylic acid, and 0.5 part of t-dodecyl mercaptan was added at 70° C. with stirring for a polymerization reaction. After the reaction, the sample was neutralized and adjusted to pH of 8 to 8.5 with sodium hydroxide and then filtered through a 0.3 μm filter to yield a dispersion liquid of core-shell polymer particles dispersed in water. The glass transition temperatures of the core portion and the shell portion of the resulting core-shell polymer particles were measured by differential scanning calorimetry (DSC) in accordance with JIS K7121, and the results were −10° C. and 33° C., respectively. The differential scanning calorimeter used was model DSC 6220 manufactured by Seiko Instruments. The particle size φ (nm) of the resulting core-shell polymer particles was measured with Microtrac UPA (manufactured by Nikkiso). The average particle size was 200 nm.

Preparation of Resin Fine Particles B

Resin fine particles B were prepared in the same manner as resin fine particles A, except that a polyfunctional acrylic monomer was added with a proportion of 30% relative to the shell resin for the synthesis of the shell resin. Resin fine particles B are crosslinked at the peripheries.

Preparation of Resin Fine Particles C

Resin fine particles C were prepared in the same manner as resin fine particles B, except that the polyfunctional monomer was added with a proportion of 20% and that the monomers were replaced so that the core resin would have a Tg (measured by the DSC method) 10° C. higher than that of resin fine particles B.

Preparation of Resin Fine Particles D

Resin fine particles D were prepared in the same manner as resin fine particles B, except that the polyfunctional acrylic monomer was added with a proportion of 50%.

Measurement of the Time to Melt

An aqueous solution containing 1% by mass of a surfactant was prepared, and 0.5 g of resin fine particles were dispersed in 1 g of this aqueous solution. A droplet of the resulting dispersion liquid was dropped on a polyethylene terephthalate film tilted at 45° with a dropper and was then immediately heated at 40° C. on the film tilted at 45°. Then, a sufficient amount of water was applied to the surface of the film to remove the surfactant a predetermined time after the heating is started. The film was naturally dried at ordinary temperature and used as a sample for evaluation. Thus, samples were prepared by varying the predetermined time. The state of resin fine particles of each sample was observed over the polyethylene terephthalate film under a scanning electron microscope at a magnification of 30000 times. When two or more resin fine particles were fused to associate at the boundary thereof, the resin fine particles were considered to be melting. For each sample, the shortest time of the predetermined times at which melting was recognized was determined as the time taken for the resin of resin fine particles to melt at 40° C. with the surfactant. The time taken for the resin of resin fine particles to melt at 80° C. with a surfactant was determined by observing each sample prepared in the same manner as above. When resin fine particles were not in the form of particles on the film, the melting of the resin was considered to be completed, and the shortest time of the predetermined times at which the completion of melting was recognized was determined as the time taken for the resin of resin fine particles to melt at 80° C. with the surfactant. Table 2 shows time A taken for the resin of resin fine particles to melt at 40° C. with the surfactant, time B taken for the resin to melt at 80° C. with the surfactant, and the ratio (A/B) of time A to time B. The unit of time is minute.

TABLE 2

| Resin | Surfactant | A (min) | B (min) | A/B |
|---|---|---|---|---|
| Resin fine particles A | SAG002 | 30 | 0.5 | 60 |
| | SAG008 | 60 | 0.5 | 120 |
| | SAG014 | 60 | 0.5 | 120 |
| | E1010 | 60 | 0.5 | 120 |
| | SAG503A | 60 | 0.5 | 120 |
| Resin fine particles B | SAG002 | 30 | 0.5 | 60 |
| | SAG008 | 725 | 1 | 725 |
| | SAG014 | 840 | 1 | 840 |
| | E1010 | 1350 | 1 | 1350 |
| | SAG503A | 1340 | 1 | 1340 |
| Resin fine particles C | SAG014 | 340 | 3 | 113 |
| Resin fine particles D | E1010 | 1830 | 3 | 610 |

Preparation of Aqueous Ink Compositions

Ingredients were mixed with the proportions of basic composition 1 or 2 shown in Table 3 and fully stirred. Each aqueous ink composition was thus prepared. The amount of the surfactant added was shown in Tables 4 to 6. The values shown in Table 3 are on a percent-by-mass basis, and the total content of each composition is 100.0% by mass.

TABLE 3

|  |  | Standard boiling point (° C.) | Basic composition 1 | Basic composition 2 |
|---|---|---|---|---|
| Pigment solids content | C.I. Pigment Blue 15:3 | — | 4 | 4 |
| Dispersant resin | Styrene-acrylic acid-based water soluble resin (Tg: 55° C.) | — | 1 | 1 |
| Resin fine particles | See Tables 4 to 6 | — | 3 | 3 |
| Solvent 1 | 2-Pyrrolidone | 245 | 15 | 12 |
| Solvent 2 | 1,3-Butanediol | 207 | 6 | 3 |
| Solvent 3 | 1,2-Hexanediol | 224 | 6 | 3 |
| Solvent 4 | Glycerin | 290 | 0 | 7 |
| Surfactant | See Tables 4 to 6 |  |  |  |
| Water |  |  | Balance | Balance |
| Total |  |  | 100 | 100 |

TABLE 4

|  | Resin Type | Surfactant Type | Surfactant Amount (%) | Basic composition | Primary drying temperature (° C.) | Head | Filling | Rub fastness | Stability of continuous ejection | Glossiness |
|---|---|---|---|---|---|---|---|---|---|---|
| Comparative Example 1 | Resin fine particles A | SAG002 | 1 | Composition 1 | 40 | Head 1 | Good | Good | Bad | Good |
| Comparative Example 2 |  |  | 1.25 | Composition 1 | 40 | Head 1 | Good | Good | Bad | Good |
| Comparative Example 3 |  |  | 1.5 | Composition 1 | 40 | Head 1 | Good | Fair | Bad | Good |
| Comparative Example 4 |  |  | 1.75 | Composition 1 | 40 | Head 1 | Good | Bad | Bad | Good |
| Comparative Example 5 |  | SAG008 | 1 | Composition 1 | 40 | Head 1 | Fair | Good | Bad | Good |
| Comparative Example 6 |  |  | 1.25 | Composition 1 | 40 | Head 1 | Fair | Good | Bad | Good |
| Comparative Example 7 |  |  | 1.5 | Composition 1 | 40 | Head 1 | Good | Fair | Bad | Good |
| Comparative Example 8 |  |  | 1.75 | Composition 1 | 40 | Head 1 | Good | Bad | Bad | Good |
| Comparative Example 9 |  | SAG014 | 1 | Composition 1 | 40 | Head 1 | Fair | Good | Bad | Good |
| Comparative Example 10 |  |  | 1.25 | Composition 1 | 40 | Head 1 | Fair | Good | Bad | Good |
| Comparative Example 11 |  |  | 1.5 | Composition 1 | 40 | Head 1 | Good | Fair | Bad | Good |
| Comparative Example 12 |  |  | 1.75 | Composition 1 | 40 | Head 1 | Good | Bad | Bad | Good |
| Comparative Example 13 |  | E1010 | 1 | Composition 1 | 40 | Head 1 | Bad | Good | Bad | Good |
| Comparative Example 14 |  |  | 1.25 | Composition 1 | 40 | Head 1 | Bad | Good | Bad | Good |
| Comparative Example 15 |  |  | 1.5 | Composition 1 | 40 | Head 1 | Bad | Fair | Bad | Good |
| Comparative Example 16 |  |  | 1.75 | Composition 1 | 40 | Head 1 | Fair | Bad | Bad | Good |
| Comparative Example 17 |  | SAG503A | 1 | Composition 1 | 40 | Head 1 | Fair | Good | Bad | Good |
| Comparative Example 18 |  |  | 1.25 | Composition 1 | 40 | Head 1 | Fair | Good | Bad | Good |
| Comparative Example 19 |  |  | 1.5 | Composition 1 | 40 | Head 1 | Good | Good | Bad | Good |
| Comparative Example 20 |  |  | 1.75 | Composition 1 | 40 | Head 1 | Good | Bad | Fair | Good |
| Comparative Example 21 |  | None |  | Composition 1 | 40 | Head 1 | Terrible | Good | Good | Bad |

TABLE 5

| | Resin Type | Surfactant Type | Amount (%) | Basic composition | Primary drying temperature (° C.) | Head | Filling | Rub fastness | Stability of continuous ejection | Glossiness |
|---|---|---|---|---|---|---|---|---|---|---|
| Comparative Example 21 | Resin fine particles B | SAG002 | 1 | Composition 1 | 40 | Head 1 | Good | Good | Bad | Fair |
| Comparative Example 22 | | | 1.25 | Composition 1 | 40 | Head 1 | Good | Good | Bad | Fair |
| Comparative Example 23 | | | 1.5 | Composition 1 | 40 | Head 1 | Good | Fair | Bad | Fair |
| Comparative Example 24 | | | 1.75 | Composition 1 | 40 | Head 1 | Good | Bad | Bad | Fair |
| Example 1 | | SAG008 | 1 | Composition 1 | 40 | Head 1 | Fair | Good | Fair | Rather bad |
| Example 2 | | | 1.25 | Composition 1 | 40 | Head 1 | Fair | Good | Fair | Fair |
| Example 3 | | | 1.5 | Composition 1 | 40 | Head 1 | Good | Fair | Fair | Fair |
| Example 4 | | | 1.75 | Composition 1 | 40 | Head 1 | Good | Bad | Good | Fair |
| Example 5 | | SAG014 | 1 | Composition 1 | 40 | Head 1 | Fair | Good | Fair | Rather bad |
| Example 6 | | | 1.25 | Composition 1 | 40 | Head 1 | Fair | Good | Fair | Fair |
| Example 7 | | | 1.5 | Composition 1 | 40 | Head 1 | Good | Fair | Fair | Fair |
| Example 8 | | | 1.75 | Composition 1 | 40 | Head 1 | Good | Bad | Good | Fair |
| Example 9 | | E1010 | 1 | Composition 1 | 40 | Head 1 | Bad | Good | Fair | Rather bad |
| Example 10 | | | 1.25 | Composition 1 | 40 | Head 1 | Bad | Fair | Fair | Rather bad |
| Example 11 | | | 1.5 | Composition 1 | 40 | Head 1 | Bad | Bad | Fair | Fair |
| Example 12 | | | 1.75 | Composition 1 | 40 | Head 1 | Fair | Bad | Fair | Fair |
| Example 13 | | SAG503A | 1 | Composition 1 | 40 | Head 1 | Fair | Good | Fair | Fair |
| Example 14 | | | 1.25 | Composition 1 | 40 | Head 1 | Fair | Good | Fair | Fair |
| Example 15 | | | 1.5 | Composition 1 | 40 | Head 1 | Good | Good | Good | Fair |
| Example 16 | | | 1.75 | Composition 1 | 40 | Head 1 | Good | Bad | Good | Fair |
| Comparative Example 25 | | None | | Composition 1 | 40 | Head 1 | Terrible | Good | Good | Bad |
| Example 17 | | E1010 | 1 | Composition 2 | 40 | Head 1 | Fair | Bad | Good | Good |
| Example 18 | | | 1.25 | Composition 2 | 40 | Head 1 | Good | Bad | Good | Good |
| Example 19 | | | 1.5 | Composition 2 | 40 | Head 1 | Good | Bad | Good | Good |
| Example 20 | | | 1.75 | Composition 2 | 40 | Head 1 | Good | Bad | Good | Good |
| Example 21 | | E1010 | 1 | Composition 1 | 35 | Head 1 | Fair | Fair | Good | Fair |
| Example 22 | | | 1.25 | Composition 1 | 35 | Head 1 | Fair | Bad | Good | Fair |
| Example 23 | | | 1.5 | Composition 1 | 35 | Head 1 | Fair | Bad | Good | Good |
| Example 24 | | | 1.75 | Composition 1 | 35 | Head 1 | Good | Bad | Good | Good |
| Example 25 | | E1010 | 1 | Composition 1 | 40 | Head 2 | Bad | Good | Good | Rather bad |
| Example 26 | | | 1.25 | Composition 1 | 40 | Head 2 | Bad | Fair | Good | Rather bad |
| Example 27 | | | 1.5 | Composition 1 | 40 | Head 2 | Bad | Bad | Good | Fair |
| Example 28 | | | 1.75 | Composition 1 | 40 | Head 2 | Fair | Bad | Good | Fair |

TABLE 6

| | Resin Type | Surfactant Type | Amount (%) | Basic composition | Primary drying temperature (° C.) | Head | Filling | Rub fastness | Stability of continuous ejection | Glossiness |
|---|---|---|---|---|---|---|---|---|---|---|
| Comparative Example 26 | Resin fine particles C | SAG014 | 1 | Composition 1 | 40 | Head 1 | Bad | Good | Bad | Bad |
| Comparative Example 27 | | | 1.25 | Composition 1 | 40 | Head 1 | Bad | Fair | Bad | Bad |
| Comparative Example 28 | | | 1.5 | Composition 1 | 40 | Head 1 | Bad | Bad | Bad | Bad |
| Comparative Example 29 | | | 1.75 | Composition 1 | 40 | Head 1 | Fair | Bad | Bad | Bad |
| Example 29 | Resin fine particles D | E1010 | 1 | Composition 1 | 40 | Head 1 | Bad | Good | Good | Bad |
| Example 30 | | | 1.25 | Composition 1 | 40 | Head 1 | Bad | Fair | Good | Bad |
| Example 31 | | | 1.5 | Composition 1 | 40 | Head 1 | Bad | Bad | Good | Bad |
| Example 32 | | | 1.75 | Composition 1 | 40 | Head 1 | Fair | Bad | Good | Bad |

Ink Jet Recording Method

A printer modified from an ink jet printer PX-G930 (manufactured by Seiko Epson) including a platen heater and the ink jet head shown in FIG. 1 was used as a recording apparatus. One of the nozzle lines of the head of the recording apparatus was filled with each of the aqueous ink compositions prepared above, and the ink composition was ejected onto a glossy polyvinyl chloride sheet SV-G-1270G (manufactured by Roland DG Corporation) with a resolution of 720 dpi in length×720 dpi in width. At this time, the surface temperature of the recording medium was set to the primary drying temperature shown in Tables 4 to 6. The recording medium ejected from the recording apparatus was subjected to secondary drying at 100° C. for 2 minutes in an oven.

Filling Property

The outline of a dot line (proper amount of ink: 10 ng, 720 dpi) of each recorded article prepared with a proper amount (10 ng per dot) of ink was observed to examine how much the line was filled with the ink. Evaluation criteria are as follows:

Criteria:

Good: The line was straight even when observed through a loupe.

Fair: Although the line seemed straight when visually observed, a thinner portion was recognized when observed through a loupe.

Bad: A thinner portion of the line was recognized even by visual observation.

Terrible: One or some breakages in the line were recognized by visual observation or using a loupe.

Rub Fastness

Recorded articles prepared with an ink rate of 8 mg/inch$^2$ as described above were each examined by rubbing a JIS cotton test fabric (Kanakin No. 3) reciprocally 50 times with a load of 500 g in accordance with JIS P 8136 with a Gakushin-type rubbing tester AB-301 (manufacture by TESTER SANGYO). Evaluation criteria are as follows:

Criteria:

Good: There were no scratches or separation.

Fair: Scratches or separation occurred 1% or less relative to the stroke area.

Bad: Scratches or separation occurred more than 1% relative to the stroke area.

Stability of Continuous Ejection

Continuous printing was performed in the environment of 25° C. and a relative humidity of 20% in the same manner as the above-described ink jet recording method for examining ejection stability. For this examination, a half of all the nozzles in the nozzle line was not used (through which ink was not ejected). One nozzle line had 180 nozzles. The ink in the nozzles not used for printing was flushed into a flushing box every time a pass was made. Suction for cleaning was not performed during printing. Printing was continuously performed in such a manner for 2 hours. After the printing, the nozzles in the nozzle line were cleaned by suction so that ink was discharged at a rate of 3 mL per nozzle line. Then, the stability of continuous ejection was evaluated according to the following criteria.

Criteria:

Good: All the nozzles were recovered by a single suction cleaning operation.

Fair: All the nozzles were recovered by two to three suction cleaning operations.

Bad: None of the nozzles were recovered by four suction cleaning operations.

Glossiness

The same recording medium was used as that used in the examination for rub fastness. The glossiness of the printed pattern on the medium was measured at a tilt angle of 60° with a glossmeter (manufactured by Konica Minolta). Evaluation criteria are as follows:

Criteria:

Good: 80 or more

Fair: 50 to less than 80

Rather bad: 20 to less than 50

Bad: Less than 20

The entire disclosure of Japanese Patent Application No. 2016-076005, filed Apr. 5, 2016 is expressly incorporated by reference herein.

What is claimed is:

1. An aqueous ink composition comprising:
   an organic solvent;
   a surfactant; and
   resin particles made of a resin, the resin taking a time A to melt at 40° C. with the surfactant, the time A being 500 minutes or more,
   wherein the organic solvent includes an organic solvent having a standard boiling point of more than 280° C., and a content of the organic solvent having the standard boiling point of more than 280° C. is greater than 0% by mass and less than 3% by mass relative to the total mass of the aqueous ink composition, and
   wherein the surfactant is selected from the group consisting of a perfluoroalkylsulfonic acid salt, a perfluoroalkylphosphoric acid ester, a perfluoroalkylethylene oxide adduct, a perfluoroalkylbetaine, a perfluoroalkylamine oxide compound, and a polyether-modified organosiloxane.

2. The aqueous ink composition according to claim 1, wherein the resin takes a time B to melt at 80° C. with the surfactant and the time B is 5 minutes or less.

3. The aqueous ink composition according to claim 2, wherein the ratio A/B of the time A to the time B is 300 or more.

4. The aqueous ink composition according to claim 1, wherein the organic solvent includes an organic solvent having a standard boiling point of 280° C. or less.

5. The aqueous ink composition according to claim 4, wherein the content of the organic solvent having a standard boiling point of 280° C. or less is in the range of 5% by mass to 30% by mass relative to the total mass of the aqueous ink composition.

6. The aqueous ink composition according to claim 1, wherein the content of the resin particles is in the range of 0.5% by mass to 15% by mass relative to the total mass of the aqueous ink composition.

7. The aqueous ink composition according to claim 1, wherein the content of the surfactant is in the range of 0.3% by mass to 3% by mass relative to the total mass of the aqueous ink composition.

8. The aqueous ink composition according to claim 1, wherein the surfactant has a hydrophile-lipophile balance of 7 to 14.

9. The aqueous ink composition according to claim 1, wherein the surfactant is at least one of an acetylene glycol-based surfactant and a silicone surfactant.

10. The aqueous ink composition according to claim 1, wherein the resin particles are made of a composite resin.

11. The aqueous ink composition according to claim 1, wherein the resin of the resin particles contains a (meth) acrylic resin.

12. An ink jet recording method comprising:
    applying the aqueous ink composition as set forth in claim 1 onto a recording medium through a nozzle of an ink jet head.

13. An ink jet recording method comprising:
    applying the aqueous ink composition as set forth in claim 2 onto a recording medium through a nozzle of an ink jet head.

14. An ink jet recording method comprising:
    applying the aqueous ink composition as set forth in claim 3 onto a recording medium through a nozzle of an ink jet head.

15. An ink jet recording method comprising:
    applying the aqueous ink composition as set forth in claim 4 onto a recording medium through a nozzle of an ink jet head.

16. An ink jet recording method comprising:
    applying the aqueous ink composition as set forth in claim 5 onto a recording medium through a nozzle of an ink jet head.

17. The ink jet recording method according to claim 12, wherein when the aqueous ink composition is applied onto the recording medium, the recording medium has a surface temperature of 70° C. or less.

18. The ink jet recording method according to claim 12, wherein the ink jet head includes a pressure chamber having an outlet through which the aqueous ink composition is transferred to the nozzle, and an element capable of applying a pressure to the aqueous ink composition in the pressure chamber to eject the aqueous ink composition through the nozzle, and wherein the element is disposed at a position in the pressure chamber other than the position opposing the outlet.

* * * * *